April 30, 1968     E. H. HALSTED     3,380,314
MOTOR VIBRATION DAMPING SYSTEM
Filed Feb. 23, 1966     2 Sheets-Sheet 1
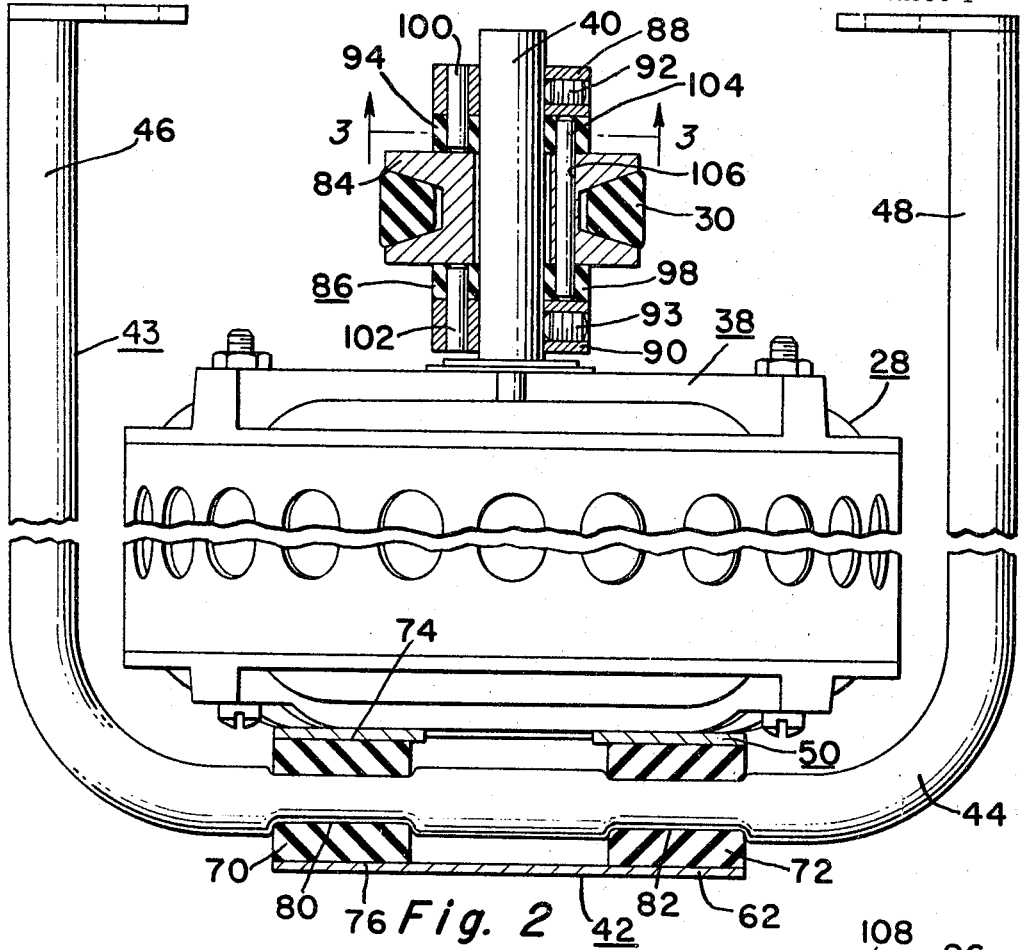
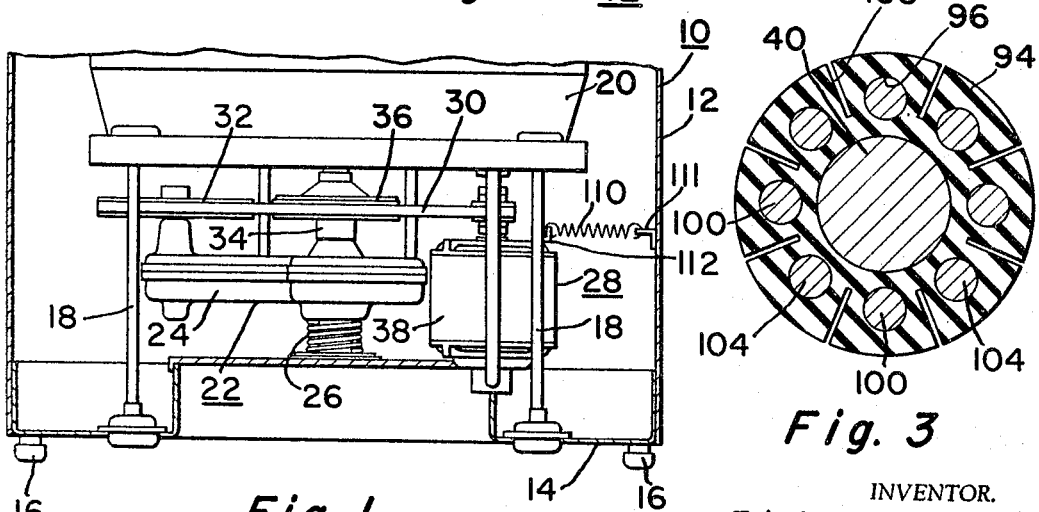
INVENTOR.
Edwin H. Halsted
BY
J.C. Evans
His Attorney INVENTOR.
Edwin H. Halsted
BY J.C. Evans
His Attorney United States Patent Office 3,380,314
Patented Apr. 30, 1968

3,380,314
MOTOR VIBRATION DAMPING SYSTEM
Edwin H. Halsted, Dayton, Ohio, assignor to General Motors Corporation, Detroit, Mich., a corporation of Delaware
Filed Feb. 23, 1966, Ser. No. 529,508
4 Claims. (Cl. 74—228)

ABSTRACT OF THE DISCLOSURE

In preferred form, a motor vibration isolating system and pulley belt tensioning device for a domestic washer in which a motor is resiliently mounted to a bracket fixed to the washer container that defines a horizontal pivot axis about which the motor is spring biased to increase belt tension between a drive pulley driven by a vertical shaft of the motor through a reflexible coupling and a driven pulley driving the washer spin and agitate mechanisms.

This invention is directed to motor driven belt-pulley systems and more particularly to such systems for use in domestic appliances such as washing machines or the like.

In domestic appliances it is desirable to maintan a relatively low noise level during the operation of the appliance. In many domestic appliances a belt-pulley motor driven drive system is utilized to operate various driven components such as washing machine agitators, spin drums and the like and in such systems, it has been the practice to include idler pulleys to compensate for any slack in the belt between the drive and driven pulleys of the system. Furthermore, in order to reduce transfer of vibrations from the drive motor into other components of the system, various resilient motor mounting schemes have been proposed and used to locate the drive motor with respect to the rest of the machine.

An object of the present invention is to improve domestic appliances such as washing machines or the like by the provision therein of an improved motor driven belt-pulley system that utilizes the resilient mounting of the drive motor of the system as a component part of a belt slack compensating arrangement in the system.

A further object of the present invention is to improve motor driven belt-pulley systems by the provision of a motor having a drive shaft therefrom operatively connected through resilient coupling means to a drive pulley and wherein the motor is resiliently suspended on a fixed support by resilient, vibration damping bushing means disposed on a member defining an axis for pivotal movement of the motor means with respect to the fixed support and wherein spring means are provided to bias continually the motor means in a direction opposite to belt pull about the drive pulley whereby the motor means is pivoted about the resilient mounting bushings to locate the drive shaft of the motor means to compensate for slack in a belt passing about the drive pulley.

Yet another object of the present invention is to improve systems of the type set forth in the preceding object wherein the means for coupling the drive pulley to the drive shaft includes a resilient coupling operative to have a first predetermined torsional yield during a first phase of operation of the motor means and a second stronger torsional characteristic during normal operation of the motor means.

Still another object of the present invention is to improve systems of the type set forth in the preceding object wherein the drive pulley has a radially inwardly located surface spaced from the drive shaft a predetermined distance and movable into engagement with the drive shaft when certain loads are imposed on the belt-pulley system driven thereby to serve as a stop to prevent undesirable relative movements between the resilient coupling and the drive pulley connected thereto.

Further objects and advantages of the present invention will be apparent from the following description, reference being had to the accompanying drawings wherein a preferred embodiment of the present invention is clearly shown.

In the drawings:

FIGURE 1 is a fragmentary front elevational view partially in vertical section showing a washing machine equipped with the drive system of the present invention;

FIGURE 2 is an enlarged view partially broken away and partially in vertical section of the drive motor of the present invention;

FIGURE 3 is an enlarged view in horizontal section taken along the line 3—3 of FIGURE 2.

Figure 4:
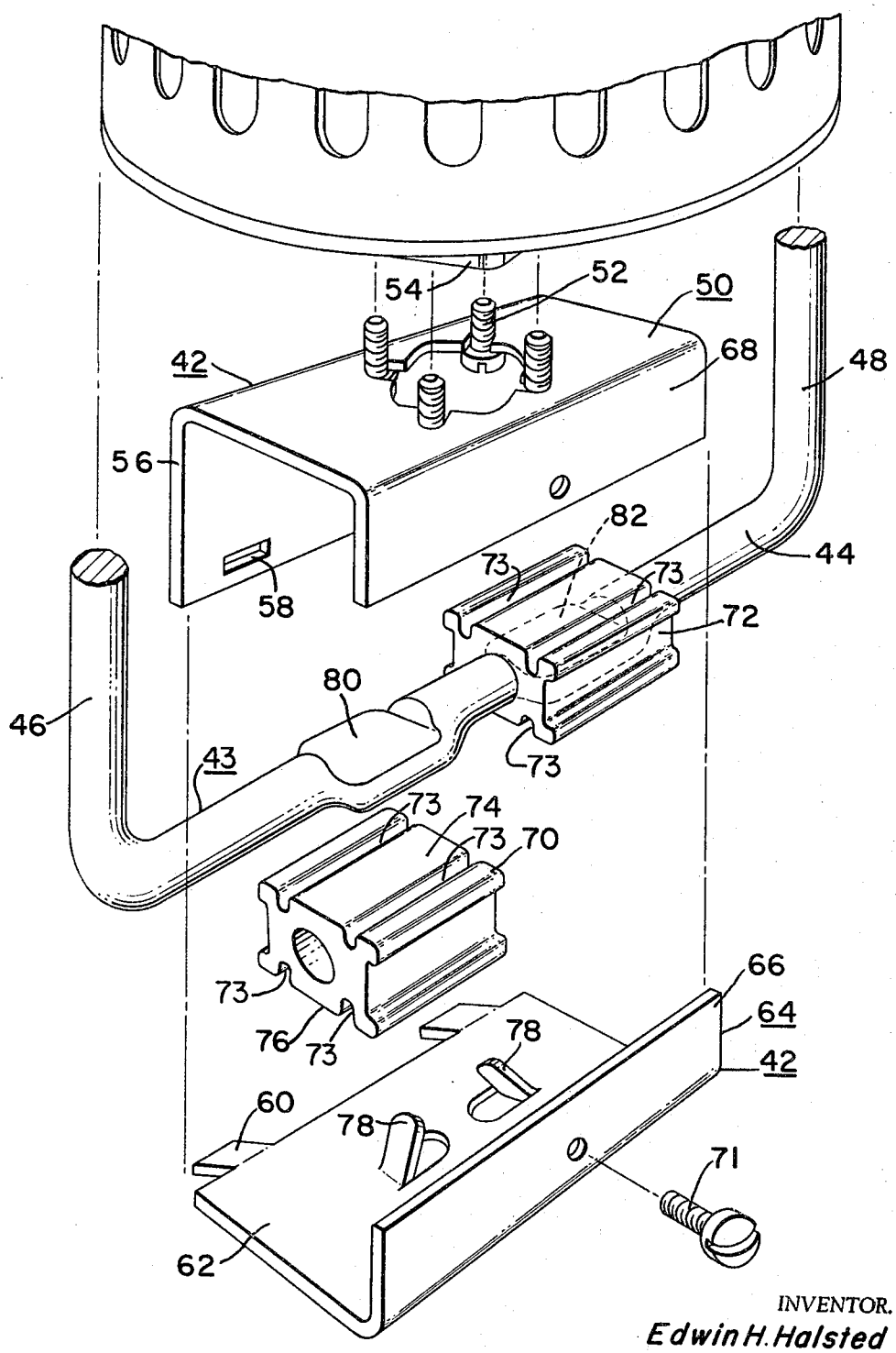
FIGURE 4 is an exploded view in perspective of a vibration isolating motor mounting arrangement in the system of the present invention.

Referring now to the drawings, in FIGURE 1 a domestic washing machine 10 is illustrated including an outer cabinet 12 having a base 14 with depending feet 16 thereon for engaging a supporting floor. On the base 14 are supported a plurality of spaced apart resilient suspension units 18 that support a water container 20 of the appliance 10 in which is located a rotatable spin tub (not shown) having a clothes agitator therein each of which are driven through predetermined operative cycles by a drive system 22 including a transmission 24 supported on the base 14 by a horizontal snubbing assembly 26. The drive system 22 further includes an electric motor 28 that drives a belt 30 which passes over a pulley 32 for directing power into the transmission 24 through an output shaft 34 either to drive the agitator or to spin the clothes containing tub at high speed through a pulley 36. The illustrated washer 10 is set forth more specifically in United States Patent No. 2,585,107, issued February 12, 1952, and is representative of one arrangement suitable for association with the present invention.

In machines of the illustrated type, it has been observed that the vibrations produced by the electric drive motor during the operation of the machine are often passed into the water container 20 to be amplified therein to produce an observable noise level that is quite distracting. Furthermore, in machines of the illustrated type, to maintain a predetermined desired belt tension in the system, it has been necessary either to provide idler pulleys or like compensating systems such as slideways for tightening the belt in the system. In the illustrated arrangement, both the belt tightening problem and the transfer of vibrations into the machine from the drive motor thereof have been solved by a functional interrelationship between resilient bushing means for isolating the vibrations of the motor from the machine and a motor positioning arrangement that utilizes the resilient bushings to compensate for belt slack.

More particularly, the motor 28 is illustrated as having an outer casing 38 with a drive shaft 40 directed from one end thereof and a resilient mount assembly 42 secured to the opposite end thereof which is connected to a yoke member 43 including an elongated horizontal arm 44 directed beneath motor 28 and having spaced apart upwardly directed arms 46, 48 on either side of the motor 28 fixedly secured to the underside of the water container 20. The resilient mount assembly 42, more particularly, includes a bracket plate 50 having screws 52 directed therethrough that are threaded into end frame 54 on the end of the motor shell 38. The bracket 50 has a depending arm portion 56 with openings 58 therein which receive tabs 60 on the edge of a leg 62 of a second bracket 64 which has another leg 66 that overlies a depending portion 68 on bracket 50 in juxtaposition relationship therewith. A suitable fastening element, shown as a screw 71, is directed through both the legs 66, 68 to interconnect the bracket members 50, 64 together. Within the joined bracket members 50, 64 are located a pair of spaced apart resilient bushings 70, 72 each of which has a generally rectangular form with spaced apart surfaces 74, 76 thereon that seat against the bracket members 50, 64, respectively. The bracket leg 62 has inwardly directed portions 78 thereon that are located between the surfaces 76 on the bushings 70, 72 to index the bushings with respect to the bracket members 50, 64. Additionally, the tubular elongated horizontal arm 44 is deformed or flattened at 80, 82 to form an indexing surface on the tubular arm 44 for maintaining the bushings 70, 72 at a fixed location thereon.

The bushings 70, 72 have a predetermined resiliency due in part to slots 73 therein to prevent an undesirable transfer of vibrations from the motor 28 through the arms 46, 48 into the water container 20. As the motor 28 starts, certain of the slots 73 of bushings 70, 72 collapse to resist torsional movement of motor 28.

In addition to the vibration isolating action of the bushings 70, 72, vibration isolation is provided at the opposite end of the motor 28 since the drive shaft 40 is connected to a drive pulley 84 by a resilient coupling assembly 86 that further reduces vibration transfer from the motor 28 into the operative system associated therewith. More particularly, the coupling assembly 86 includes spaced apart rings 88, 90 that are locked to the outer periphery of the shaft 40 by set screws 92, 93. Between the ring 88 and the upper face of the pulley 84 is located a first annular coupling member 94 of resilient material that has a plurality of openings 96 directed therethrough at equally spaced circumferentially located points. A like annular resilient coupling member 98 is disposed between the ring 90 and the underside of the pulley 84.

Alternate ones of the openings 96 in the annular coupling member 94 receive a first plurality of pins 100 that are directed through the ring 88 to interlock the fixed ring 88 to the coupling member 94. Likewise, a plurality of pins 102 are directed through the fixed ring 90 and into alternate ones of the openings 96 in the coupling member 98. The coupling members 96, 98 are interconnected to the pulley 84 by another plurality of longer pins 104 that extend through openings 106 in the pulley 84 having the opposite ends thereof directed, respectively, into the remaining alternate openings 96 in the coupling members 94, 98. In addition to the openings 96 through the coupling members 94, 98, each of these members includes a plurality of slots 108 formed in the outer periphery thereof through the depth thereof at circumferentially located points intermediate each of the openings 96 therethrough.

By virtue of this arrangement, the drive shaft 40 is torsionally, resiliently coupled to the drive pulley 84 and as a result, certain vibrations from the motor 28 are isolated effectively by the coupling 86 from the driven belt and pulleys 32, 36 thereby reducing the overall operational noise in the washing machine 10. The provision of slots 108 produces a relatively soft yield of the coupling 86 during normal phases of operation of the motor 28 that is preceded by a predetermined lesser resiliency in the coupling members 94, 98 during start-up phases of operation at which time the portions of the annular coupling member between the pins 100, 104 or pins 102, 104 are compressed sufficiently to close the slots 108.

In the illustrated arrangement to obtain compensation for belt slack a spring 110 having one end thereof secured to a fixed support 111 on the casing 12 and the opposite end thereof fixed to a bracket 112 fixed to the upper end of the motor 28 exerts a continuous biasing action on the housing 33 causing it to pivot about the axis defined by the horizontal elongated arm 44 carrying the resilient bushings 70, 72 whereby the shaft 40 is shifted continually to compensate for slack produced in the belt 30 during the operation of the machine.

The resilient mounting of the motor 28 at the base thereof thereby, in addition to isolating vibrations, in part, serves to compensate for slack in the belt-pulley system.

While the embodiment of the present invention as herein disclosed constitutes a preferred form, it is to be understood that other forms might be adopted.

What is claimed is as follows:

1. In a motor drive system, the combination of, a driven shaft, a driven pulley secured to said driven shaft, motor means, a drive shaft extending vertically from said motor means, a drive pulley, first damping means for resiliently coupling said drive pulley to said shaft, a belt passed over said drive and driven pulleys for transferring power from said motor means to said driven shaft, spring means connected to said motor means for biasing said drive shaft in a direction to take up belt slack, second damping means for resiliently supporting said motor means including an elongated arm defining a pivot axis perpendicular to said drive shaft about which said motor means is movable by said spring means during take-up of belt slack, said first and said second damping means each having a relatively lesser resiliency during initial energization of said motor means to resist torque movements of said motor means and a greater resiliency following motor start to damp vibrations in said motor means.

2. In combination of claim 1, said means for resiliently supporting said motor means including a yoke member, said elongated arm being part of said yoke member and directed across said motor means at an end thereof opposite said vertically directed shaft, a pair of spaced apart resilient bushings on said arm in engagement with said end of said motor means for resiliently supporting said motor means, and clamp means for securing said bushings to said motor means, said bushings yielding against relative movement between said motor means and said yoke member to isolate motor vibrations from said yoke member.

3. In a motor drive system, the combination of, a driven shaft, a driven pulley secured to said driven shaft, motor means, a drive shaft extending vertically from said motor means, a drive pulley, means for coupling said drive pulley to said shaft, a belt passed over said drive and driven pulleys for transferring power from said motor means to said driven shaft, spring means connected to said motor means for biasing said drive shaft in a direction to take up belt slack, means for resiliently supporting said motor means including an elongated arm defining a pivot axis perpendicular to said drive shaft about which said motor means is movable by said spring means during take-up of belt slack, said coupling means including a lock ring, means for fixedly securing said lock ring to said drive shaft, an annular coupling member of resilient material surrounding said shaft, a first plurality of pins connecting said ring to said coupling member, a second plurality of pins connecting said coupling member to said drive pulley, said first and second plurality of pins being offset from one another in said coupling member to provide a predetermined torsional resiliency between said drive shaft and said drive pulley, said drive shaft being directed through said drive pulley in spaced relationship therewith, and said shaft being engageable with said drive pulley to stop a predetermined relative movement therebetween to limit undesirable wear of said coupling member.

4. In a motor drive system, the combination of, a driven shaft, a driven pulley secured to said driven shaft, motor means, a drive shaft extending vertically from said motor means, a drive pulley, means for coupling said drive pulley to said shaft, a belt passed over said drive and driven pulleys for transferring power from said motor means to said driven shaft, spring means connected to said motor means for biasing said drive shaft in a direction to take up belt slack, means for resiliently supporting said motor means including an elongated arm defining a pivot axis perpendicular to said drive shaft about which said motor means is movable by said spring means during take-up of belt slack, said coupling means including a lock ring, means for fixedly securing said lock ring to said drive shaft, an annular coupling member of resilient material surrounding said shaft, a first plurality of pins connecting said ring to said coupling member, a second plurality of pins connecting said coupling member to said drive pulley, said first and second plurality of pins being offset from one another in said coupling member to provide a predetermined torsional resiliency between said drive shaft and said pulley, and said annular member having a plurality of slots formed in the outer periphery thereof between each of said openings therethrough to provide an initial relatively stiff yield in said coupling member during motor start and more resiliency following motor start.

References Cited

UNITED STATES PATENTS

| | | | |
|---|---|---|---|
| 1,714,092 | 5/1929 | Johnson | 74—242.13 X |
| 1,802,451 | 4/1931 | Summers | 248—22 X |
| 1,802,485 | 4/1931 | Smith et al. | 74—242.16 X |
| 2,061,080 | 11/1936 | Leland | 248—26 |
| 2,073,158 | 3/1937 | Kindl et al. | 74—242.13 |
| 2,235,972 | 3/1941 | Zimmerman | 74—242.15 X |
| 2,494,639 | 1/1950 | Yates | 64—10 |
| 3,108,457 | 10/1963 | Weasler | 64—13 X |
| 3,296,827 | 1/1967 | Landon et al. | 64—11 |
| 3,316,737 | 5/1967 | Hulley | 64—13 |

FRED C. MATTERN, JR., *Primary Examiner.*

J. A. WONG, *Assistant Examiner.*